(12) United States Patent
Ahlberg et al.

(10) Patent No.: US 11,755,663 B2
(45) Date of Patent: Sep. 12, 2023

(54) SEARCH ACTIVITY PREDICTION

(71) Applicants: Christopher Ahlberg, Watertown, MA (US); Bill Ladd, Cambridge, MA (US); Evan Sparks, Cambridge, MA (US)

(72) Inventors: Christopher Ahlberg, Watertown, MA (US); Bill Ladd, Cambridge, MA (US); Evan Sparks, Cambridge, MA (US)

(73) Assignee: Recorded Future, Inc., Somerville, MA (US)

( * ) Notice: Subject to any disclaimer, the term of this patent is extended or adjusted under 35 U.S.C. 154(b) by 0 days.

(21) Appl. No.: 13/657,825

(22) Filed: Oct. 22, 2012

(65) Prior Publication Data

US 2014/0114941 A1     Apr. 24, 2014

(51) Int. Cl.
*G06F 17/30*     (2006.01)
*G06F 16/951*    (2019.01)

(52) U.S. Cl.
CPC .................... *G06F 16/951* (2019.01)

(58) Field of Classification Search
CPC .......... G06F 17/60; G06F 16/13; G06F 16/24; G06F 16/156; G06Q 90/00; G06Q 30/0202; G06N 3/00; G06N 5/00; G05B 13/00
USPC ........................................................ 707/776
See application file for complete search history.

(56) References Cited

U.S. PATENT DOCUMENTS

| | | | |
|---|---|---|---|
| 5,953,717 A * | 9/1999 | Wijnholds | G06F 16/90348 |
| 8,620,852 B1 * | 12/2013 | Kipersztok | G06N 5/04 706/50 |
| 8,620,909 B1 * | 12/2013 | Rennison | G06F 16/3332 707/723 |
| 8,930,350 B1 * | 1/2015 | Herscovici | G06F 16/951 707/723 |
| 9,367,633 B2 * | 6/2016 | Blanco | G06F 16/95 |
| 10,037,346 B1 * | 7/2018 | Hsieh | G06F 16/2343 |
| 2003/0220910 A1 * | 11/2003 | Kincaid | G06F 17/30286 |
| 2004/0010481 A1 * | 1/2004 | Mani | G06N 3/049 706/21 |
| 2005/0027683 A1 * | 2/2005 | Dill et al. | 707/2 |
| 2006/0173663 A1 * | 8/2006 | Langheier et al. | 703/11 |
| 2007/0010942 A1 * | 1/2007 | Bill | 701/209 |
| 2008/0040321 A1 * | 2/2008 | Baeza-Yates | G06F 16/2477 |
| 2009/0006365 A1 * | 1/2009 | Liu et al. | 707/5 |
| 2009/0222321 A1 * | 9/2009 | Liu | G06Q 30/0202 705/7.31 |
| 2009/0254410 A1 * | 10/2009 | Chang | G06Q 30/0273 705/14.69 |
| 2010/0057687 A1 * | 3/2010 | Shen | G06Q 30/0241 |
| 2010/0114954 A1 * | 5/2010 | Sareen et al. | 707/776 |

(Continued)

*Primary Examiner* — Hung D Le (74) *Attorney, Agent, or Firm* — Kristofer E. Elbing (57) ABSTRACT

Disclosed, in one general aspect, is a computer-based method and apparatus for extracting predictive information from a collection of stored, machine-readable electronic documents. The method includes accessing at least a subset of the electronic documents each including different machine-readable predictive information about one or more future facts occurring after a publication time for that document. The method also includes extracting the predictive information about the one or more future facts from the accessed documents, and deriving one or more predicted query information items based on the predictive information extracted in the step of extracting.

24 Claims, 2 Drawing Sheets

(56) References Cited

U.S. PATENT DOCUMENTS

| | | | |
|---|---|---|---|
| 2010/0191767 A1* | 7/2010 | Dertinger | G06F 16/2462 |
| | | | 707/E17.135 |
| 2010/0305848 A1* | 12/2010 | Stallman | G06F 16/9537 |
| | | | 707/E17.014 |
| 2011/0119517 A1* | 5/2011 | Beeco et al. | 713/340 |
| 2011/0258177 A1* | 10/2011 | Wu | G06F 16/93 |
| | | | 707/711 |
| 2012/0078667 A1* | 3/2012 | Denker et al. | 705/5 |
| 2013/0103957 A1* | 4/2013 | Orr et al. | 713/300 |

\* cited by examiner

SEARCH ACTIVITY PREDICTION

CROSS-REFERENCE TO RELATED APPLICATION

This application claims the benefit under 35 U.S.C. 119(e) of U.S. provisional application Ser. No. 61/550,371 filed Oct. 21, 2011, which is herein incorporated by reference. This application is also related to U.S. Application Nos. 20100299324 and 20090132582 both entitled Information Service for Facts Extracted from Differing Sources on a Wide Area Network, which are also herein incorporated by reference.

FIELD OF THE INVENTION

This invention relates to methods and apparatus for predicting searching activity, such as search engine searching activity.

BACKGROUND OF THE INVENTION

The above-referenced applications provide a system for predicting facts from sources such as internet news sources. For example, where an article references a scheduled future fact in a textually described prediction, such as "look for a barrage of shareholder lawsuits against Yahoo next week," the system can map the lawsuit fact to a "next week" timepoint. Deriving occurrence timepoints from content meaning through linguistic analysis of textual sources in this way can allow users to approach temporal information about facts in new and powerful ways, enabling them to search, analyze, and trigger external events based on complicated relationships in their past, present, and future temporal characteristics. For example, users can use the extracted occurrence timepoints to answer the following questions that may be difficult to answer with traditional search engines:

What will the pollen situation be in Boston next week?
Will terminal five be open next month?
What's happening in New York City this week?
When will movie X be released?
When is the next SARS conference?
When is Pfizer issuing debt next?
Where Will George Bush be next week? (see page 8, paragraphs 2-3)

SUMMARY OF THE INVENTION

In one general aspect, the invention features a computer-based method for extracting predictive information from a collection of stored, machine-readable electronic documents. The method includes accessing at least a subset of the electronic documents each including different machine-readable predictive information about one or more future facts occurring after a publication time for that document. The method also includes extracting the predictive information about the one or more future facts from the accessed documents, and deriving one or more predicted query information items based on the predictive information extracted in the step of extracting.

In preferred embodiments, the step of deriving predicted query information can derive search engine queries. The step of deriving can derive advertising selections based on the step of deriving predicted query information. The step of deriving can derive predicted query information derives result pages for the queries. The method can further include the step of deriving advertising selections for the result pages based on the step of deriving predicted query information. The method can further include the step of deriving predicted query information derives keywords for queries. The step of deriving predicted information queries can derive results for queries. The step of extracting information can include extracting a predicted time of occurrence for one or more of the facts. The step of extracting information can include extracting a predicted likelihood of occurrence for one or more of the facts.

In another general aspect, the invention features an apparatus for extracting predictive information from a collection of stored, machine-readable electronic documents. The apparatus includes an interface for accessing at least a subset of the electronic documents each including different machine-readable predictive information about one or more future facts occurring after a publication time for that document. The apparatus also includes a predictive information extraction subsystem operative to extract predictive information about the one or more future facts from the accessed documents, and a predictive query information derivation subsystem operative to derive one or more predicted query information items based on the predictive information extracted by the predictive information extraction subsystem.

In preferred embodiments the predictive query information derivation subsystem can be operative to derive search engine queries. The apparatus can further include an advertising selection derivation subsystem responsive to the predictive query information derivation subsystem. The predictive query information derivation subsystem can be operative to derive result pages for the queries. The apparatus can further include an advertising selection derivation subsystem for the result pages responsive to the predictive query information derivation subsystem. The predictive query information derivation subsystem can be operative to derive keywords for queries. The predictive query information derivation subsystem can be operative to derive results for queries. The information extraction subsystem can be operative to extract a predicted time of occurrence for one or more of the facts. The information extraction subsystem can be operative to extract a predicted likelihood of occurrence for one or more of the facts.

In a further general aspect, the invention features an apparatus for extracting predictive information from a collection of stored, machine-readable electronic documents. The apparatus includes means for accessing at least a subset of the electronic documents each including different machine-readable predictive information about one or more future facts occurring after a publication time for that document. It also includes means for extracting the predictive information about the one or more future facts from the accessed documents, and means for deriving one or more predicted query information items based on the predictive information extracted by the means for extracting.

DETAILED DESCRIPTION OF AN ILLUSTRATIVE EMBODIMENT

Systems according to one aspect of the invention extract information from sources such as textual documents and use that information to predict searching activity, such as volumes of likely queries. This extraction can be performed in a number of ways, including those presented in the above-referenced applications.

Figure 1:
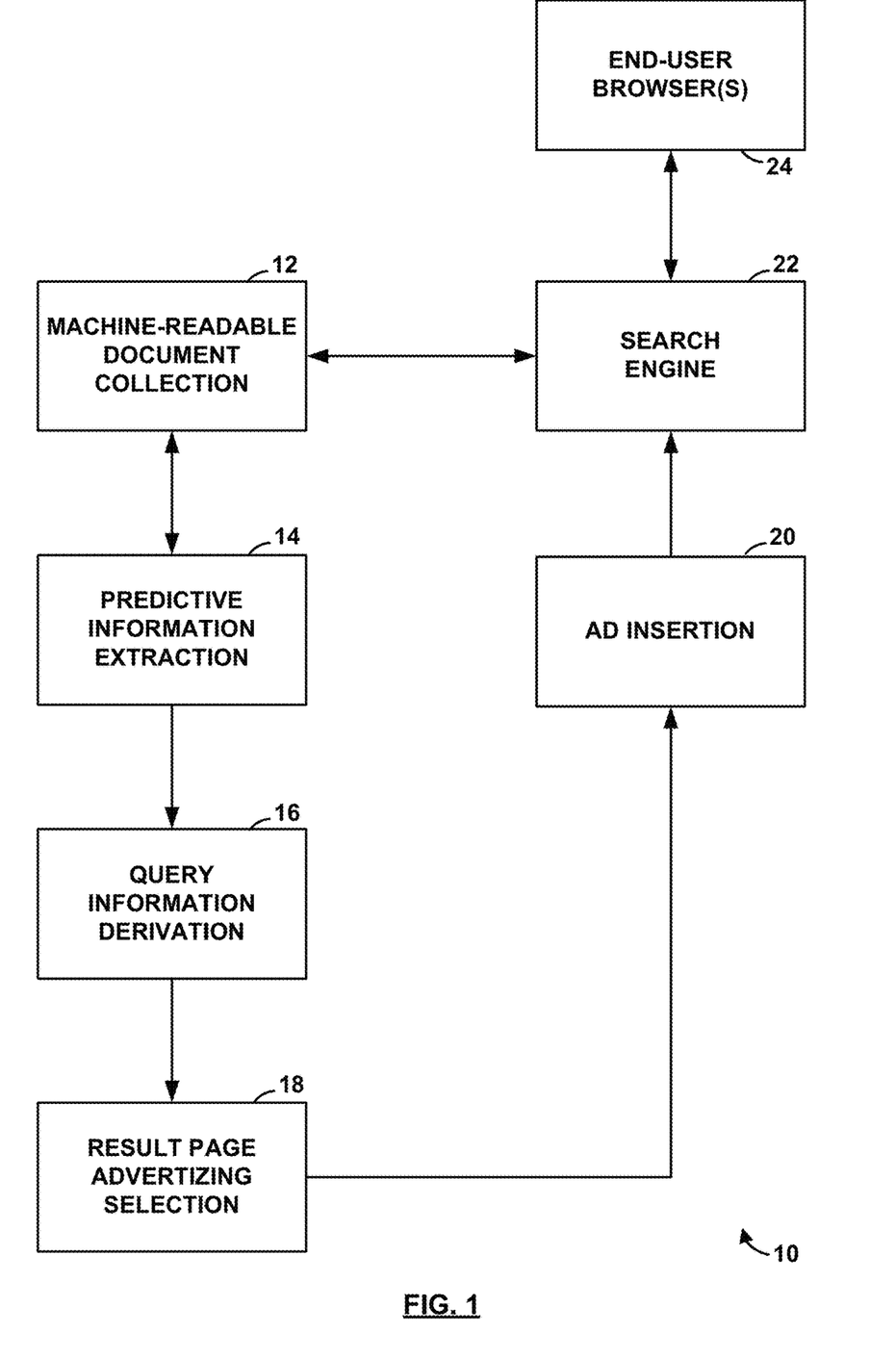
FIG. 1 is a block diagram of an illustrative system according to the invention, which is applied to selecting ads for search engine result pages.

Referring to FIG. 1, an illustrative search activity prediction system 10 with application to ad insertion includes a predictive information extraction subsystem 14, which, in one embodiment is the Recorded Future API described below. This subsystem accesses a machine-readable document collection 12, such as a set of textual documents on the internet and extracts predictive information about future facts. Any kind of fact that has an appreciable effect on searching can be used. Examples of types of facts that can be used include predicting search activity for Public companies or Products based on future events (e.g., Product releases, Company meetings, Employment change, Earnings call).

The system can be applied to ecommerce/advertising. For example, it can be used to help search engine companies, such as Google, to sell ad inventory next to future events. In one embodiment, a query information derivation subsystem includes a query information derivation subsystem 16 that derives queries based on information extracted by the predictive information extraction subsystem 14. This query information can be used in different ways, but in this example it is provided to a result page advertizing selection subsystem 18 that determines how a search engine's advertisement insertion subsystem 20 will insert advertisements based on the predictive information. End users 24 then see the inserted ads associated with search engine results when they input queries to the search engine 22.

Example 1

Figure 2:
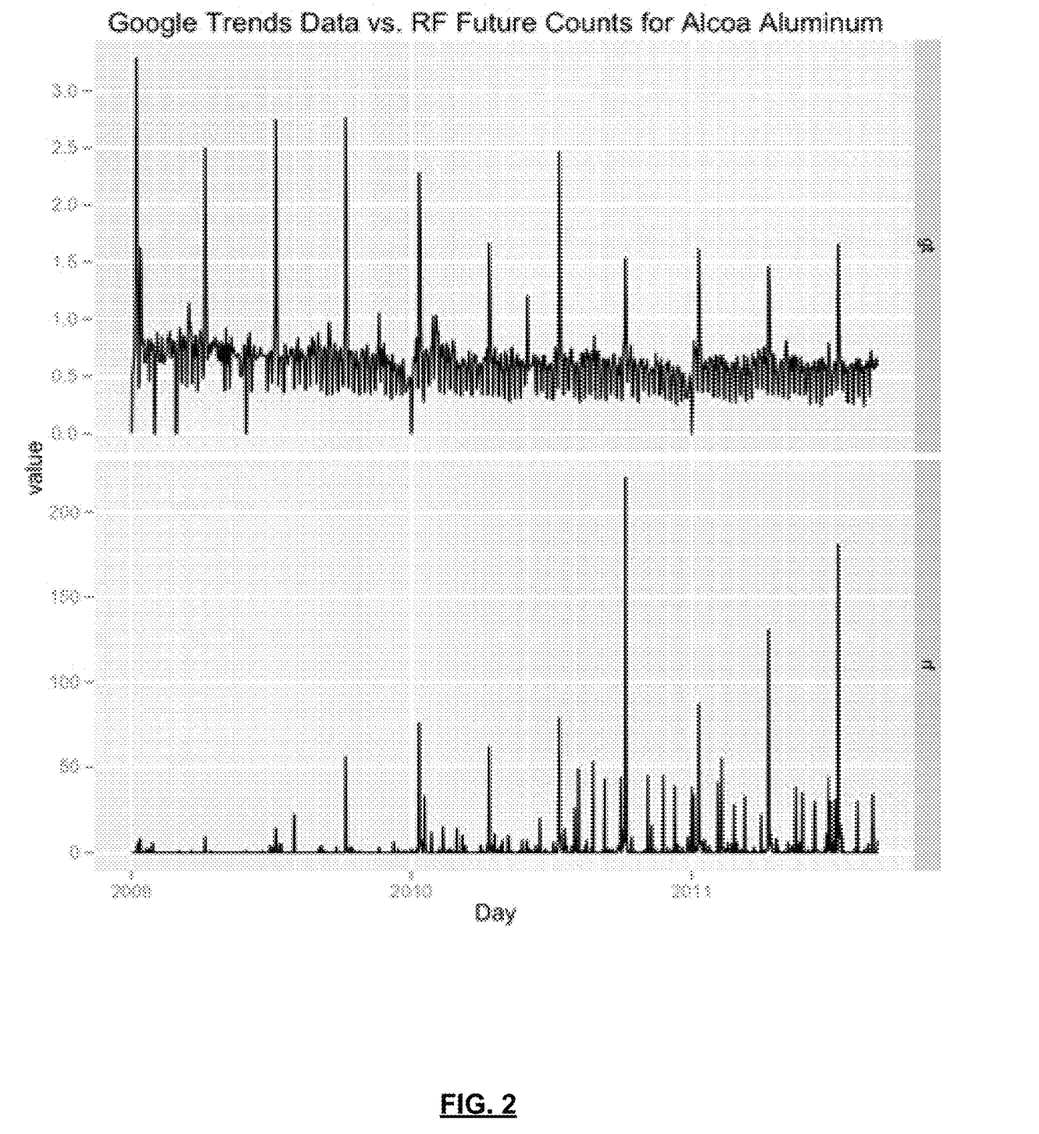
FIG. 2 is a plot of predicted event count against normalized search engine volume for an illustrative company, Alcoa Aluminum.

Referring to FIG. 2, predicted information for a series of events was extracted from on-line textual documents using the Recorded Future API. This predicted event count was then plotted against normalized search engine volume over time for an illustrative company, Alcoa Aluminum. The resulting plot shows that the event count can predict increases in search engine activity. This can be used for selecting ads to insert (i.e., related to Alcoa Aluminum), or for other applications.

Recorded Future API
  version 1.0.0
  Contents
  1 version 1.0.0
  2 Introduction
    2.1 Quick Start: Creating Requests.
  3 Input and Output in JSON
  4 Query specification
    4.1 Matching on instance identity or type
    4.2 Matching on instance time
    4.3 Matching on the canonical item
    4.4 Matching on attributes
    4.5 Matching on document and source aspects
    4.6 Output fields
    4.7 Entity details
    4.8 Response specification
  5 Aggregate Queries
  6 Examples
    6.1 Query Examples
    6.2 Response Example
  7 Working with the API in the Recorded Future UI
  8 Using the Recorded Future API with R
  9 Using the Recorded Future API with Python
  10 Entity and Event Types
    10.1 Entity Types
    10.2 Event Types Introduction The Recorded Future's API enables you to build analytic applications and perform analysis which is aware of events happening around the globe 24×7, with extensive historical records. You can perform queries and receive results from the Recorded Future Temporal Analytics Engine across a vast set of events, entities, and time points spanning from the far past into the future.

Your application can come alive with real time access into the Recorded Future engine, completely aware of events as they unfold around the world—and your analysis of for example financial markets can be made aware of events involving companies, people, products, etc. Historical archives allows you to extensively backtest results.

Sample applications and analysis built/done with the Recorded Future API include
  Interactive dashboards of global events
  Google earth overlay of global events
  Back testing whether FT Alphaville (high profile financial blog) is "better" than general news in predicting stock returns
  Back testing whether Recorded Future momentum metric accurately predicts equity trading volume
  To access Recorded Future through the API:
  1. Request a Recorded Future API token.
  2. Create a structured JSON string that describes the query.
  3. Create and submit the associated URL.
  4. Retrieve and parse the results.
  Quick Start Creating Requests.
  Queries are sent using HTTP GET to
http://api.recordedfuture.com/ws/rfq/
instances?q=query&compress=usecompression
  Zip compression is enabled if the optional attribute compress=usecompression. If the attribute is not set, no compression is used.
  Note: Queries can also be sent using HTTP POST. Do this if the query string becomes too long (typically, there is a limit on a few thousand characters for GET requests).
  Queries and responses are expressed in JSON.
  The following sample query looks for Product Release events from companies within the Information Technology sector, published in January 2010. The 100 first results are returned.

```
{
  "instance": {
    "type": ["ProductRelease"],
    "attributes": [{"name": "company",
        "entity": {"attributes": [{"name": "gics",
                    "string": "Information Technology"}]}}],
    "document": {
      "published": {"min": "2010-01-01", "max": "2010-02-01"}
    },
    "limit": 100
  },
  "output": {
    "fields": ["type", "time", "fragment", "momentum", "attributes",
              "document.title", "document.url",
  "document.published", "source.description"]
    },
    "token": TOKEN
  }
```

The following sample result is part of the response to the query, which contains information about one event instance. The result contains information about the event (an announced product release), the text fragment it was found in ("Microsoft launches tech policy Web site."), the document source (Federal Computer Week News), the document it was found in (The URL that displays the actual document), and the current momentum value.

```
{
    "fragment": "Microsoft launches tech policy Web site.",
    "stop": "2010-01-06T17:13:31.000Z",
    "start": "2010-01-06T17:13:31.000Z",
    "attributes": {
        "status": "announced",
        "company": 33312449,
        "product_type": "Other",
        "product": 33434006
    },
    "document": {
        "url": "http://fcw.com/articles/2010/01/06/microsoft-web-technology-policy.aspx",
        "source": {
            "description": "Federal Computer Week News"
        },
        "published": "2010-01-06T17:13:31.000Z",
        "title": "Microsoft launches tech policy Web site"
    },
    "type": "ProductRelease",
    "momentum": 0.044266346260364201
}
```

Entities—the people, companies, organizations, and places of the Recorded Future Who/Where list—are created on-demand as they are harvested by a query. Once an entity is defined, all references to that entity are defined as entity instances that point to the underlying canonical entity. Once an entity is defined, all references to that entity are defined as entity instances that point to the underlying canonical entity. Entities are returned in a separate structure, to avoid duplication, and in the instances only references to the entities are present, using an opaque identifier. For example, in the attributes section above there is a company with the identifier 33312449. In the entity structure, there is an parameter for that identifier:

```
"33312449": {
    "type": "Company",
    "name": "Microsoft",
    "momentum": 0.72911597000853101
}
```

For details about the exact query and response structures, see the "Query Specification" and "Response Specification" sections.

Input and Output in JSON

The Recorded Future API supports JSON as the input and output format. For a detailed JSON specification, visit Douglas Crockford's site JSON.org, paying particular attention to RFC 4627. This section provides a short excerpt.

Tip: If you are using R, you don't need to worry about formatting JSON input or parsing JSON output. R packages manage input and output for you. See "Using the Recorded Future API with R" to learn more.

JSON (JavaScript Object Notation) is a lightweight data-interchange format. It is easy for humans to read and write. It is easy for machines to parse and generate. JSON is a text format that is completely language independent but uses conventions that are familiar to programmers of the C-family of languages, including C, C++, C#, Java, JavaScript, Perl, Python, and many others. These properties make JSON an ideal data-interchange language.

JSON is built on two structures:

A collection of name/value pairs. In various languages, this is realized as an object, record, struct, dictionary, hash table, keyed list, or associative array.

An ordered list of values. In most languages, this is realized as an array, vector, list, or sequence.

These are universal data structures. Virtually all modern programming languages support them in one form or another. It makes sense that a data format that is interchangeable with programming languages also be based on these structures.

In JSON, which always uses Unicode encoding, they take on these forms:

An object is an unordered set of name/value pairs. An object begins with {(left brace) and ends with} (right brace). Each name is followed by: (colon) and the name/value pairs are separated by, (comma).

An array is an ordered collection of values. An array begins with [(left bracket) and ends with] (right bracket). Values are separated by, (comma).

A value can be a string in double quotes, or a number, or true or false or null, or an object or an array. These structures can be nested.

A string is a collection of zero or more Unicode characters, wrapped in double quotes, using backslash escapes. A character is represented as a single character string. A string is very much like a C or Java string.

A number is very much like a C or Java number, except that the octal and hexadecimal formats are not used.

Whitespace can be inserted between any pair of tokens.

Query Specification

Queries are given as the q parameter in the API URL. They need to be URL encoded.

A query has the following structure:

```
{
    "comment": <string> (optional),
    "instance": <instance_spec>,
    "output": <output_spec>,
    "token": <string>
}
```

The optional comment section can be used to document a question in human readable form. It is not used in the query.

The instance section specifies conditions that must be true for all returned instances.

```
"instance": {
    "id": [integer],
    "type": [string],
    "start_time": time-spec,
    "stop_time": time-spec,
    "canonical": canonical-constraints,
    "attributes": attributes-constraints,
    "document": document-constraints,
    "limit": integer
}
```

Matching on Instance Identity or Type id matches on instance identifiers. An identifier is a long integer, and is a system defined identification of the instance. You'll usually match on instance identifiers only when you're looking for detailed instance information using identifiers returned in the results of earlier queries. The value of id must be an integer or a list of integers. id matches if the instance identifier matches one of the provided identifiers.

type matches on the names of the canonical types of instances. The canonical types are the event types and entity types in the system, as described by the system metadata specification. The value of type must be a string or a list of strings. type matches if the name of the canonical type of the instance is one of the supplied instance type names. A list of all current entity and event types is available at the end of this document.

Matching on Instance Time start_time specifies the minimum time of the instance start time and must be a string formatted as YYYY-MM-DD.

stop_time specifies the maximum time of the instance stop time and must be a string formatted as YYYY-MM-DD.

Matching on the Canonical Item

The canonical parameter matches on aspects of the instance's canonical item. The aspects are specified using the structure:

```
"canonical": {
    "id": [integer],
    "name": [string]
}
``` id matches on canonical identifiers. An identifier is a long integer, and is a system defined identification of the canonical item. The value must be an integer or a list of integers. The value matches if the canonical identifier matches one of the provided identifiers.

You'll usually match on canonical identifiers only when you're looking for detailed instance information using identifiers returned in the results of earlier queries.

name matches on canonical names. Only canonical entities have names; canonical events do not. The value of name must be a string or a list of strings. The parameter matches if the canonical name identifier matches one of the supplied names.

Matching on Attributes

The attributes parameter matches on the attributes of the instance. The attributes section is a list of match criteria for attributes, and all entries in the list must match, in order for an instance to match. Attributes are identified by name or by type. Named attributes can be used only if a distinct type constraint has been set in the query, then all attributes of the typed item are available to be referenced by name. Typed attributes match all attributes of an item with that type. The structure of an attribute match is:

```
{
    name-or-type,
    value-constraint
}
```

The name-or-type part is either "name": attribute-name or "type": type. The value-constraint part is type dependent. Here is the list of different types, and how to match on them:

```
"string": [string]
"int":    [integer]
"float":  [float]
"bool":   [bool]
"entity": entity-match
```

Matching for the string, integer, float, and Boolean are all of the form that a single value or a list of values of the specified type. If a list is supplied, a match is found if any element of the list matches. For entity matches, the structure is a subset of the structure for entity instances, excluding the time and document constraints.

```
"entity": {
    "id": [integer],
    "name": [string],
    "attributes": attributes-constraints
}
``` id matches on the canonical entity identifier name matches on canonical entity name.

attributes recursively matches on entity attributes, as described in this section.

Matching on Document and Source Aspects document matches on aspects of the document in which the instance was found, or aspects of the source the document was received from. It has the following structure:

```
"document": {
    "id": [integer],
    "published": time-range,
    "analyzed": time-range,
    "downloaded": time-range,
    "url": string,
    "source": source-constraints
}
``` id matches on document identifiers. An identifier is a long integer, and is a system defined identification of the document. The value of the parameter must be an integer or a list of integers. The parameter matches if the document identifier matches one of the provided identifiers. You'll usually match on document identifiers only when you're looking for detailed instance information using identifiers returned in the results of earlier queries.

published matches on the publication date of the document. The value is a time-range structure:

```
{
    "min": time-spec,
    "max": time-spec
}
```

If published is not specified, there is no constraint on the document publication time. If min is specified, the publication time must not be earlier than the given time. If max is specified, the publication time must not be later than the given time. The time must be specified as a string with the date format YYYY-MM-DD.

analyzed matches on the date Recorded Future analyzed the document. analyzed has the same structure as published.

downloaded matches on the date Recorded Future downloaded the document. downloaded has the same structure as published.

url matches on the URL of the document. The value of the entry must be a string or a list of strings. The entry matches if the document URL matches one of the provided URLs.

The source constraint has the following structure:

```
"source": {
    "id": [integer],
    "name": [string],
    "description": [string],
    "topic": [string],
    "media_type": [string],
    "country": [string],
    "url": [string],
    "limit": [integer]
}
``` id matches on source identifiers. An identifier is a long integer, and is a system defined identification of a source. The value of the parameter must be an integer or a list of integers. The parameter matches if the source identifier matches one of the provided identifiers.

name matches on source name. A source name is a short string identifying the source. The value of the parameter must be a string or a list of strings. The parameter matches if the source name matches one of the supplied names.

description matches on source descriptions. A source description is a somewhat longer string identifying the source. The value of the parameter must be a string or a list of strings. The parameter matches if the source description matches one of the provided names.

topic matches on source topics. (Recorded Future categorizes all Sources into topics.) The value of the parameter must be a string or a list of strings. The parameter matches if the source topic matches one of the following names:
Business
Technology
General
Geopolitical
Energy
Legal
Healthcare
Government
Military
Financial services
Health care
Humanitarian
Environment
InfoSec
terrorism
disease
health
ISVG
Malware media_type matches on source media types. (The system categorizes all Sources into media types.) The value of the parameter must be a string or a list of strings. media_type matches if the source media type matches one of the following names:
Blog
Niche
Mainstream
Government
NGO
News_agency
Exchange
Primary_source
DataProvider country matches on the originating country of the source. The value of country must be a string or a list of strings. country matches if the source country matches one of the country names specified in the metadata document.

url matches on the URL of the source. The value of url must be a string or a list of strings. url matches if the source URL matches one of the provided names.

limit specifies the maximum number of instances in the response. The value of limit must be an integer.

Output fields

The output fields shape the query response.
Field name
Description
"id"
The identity number of the instance
"type" The name of the type of the instance
"time" Start and stop time of the instance
"time_fragment"
The text fragment from which the time was derived
"time_fragment_context" A larger context of the time fragment
"fragment"
The text fragment this instance was found in
"fragment_coentities" The list of entities found in the instance text fragment
"momentum The momentum value of this instance, a value between 0 and 1. For aggregate queries, this is the average momentum.
"sentiment"
The list of sentiments of this instance, either "positive" or negative". For aggregate queries, this is the average sentiment.
"attributes"
The attributes of this instance. The attributes with basic types are given inline. The entity attributes are given as references to the entity identifiers. The entities themselves are given in a separate dictionary, with the string form of the entity identifier as the key, and the entity details as the value.
"canonical.id" The identity number of the canonical item of this instance
"relevance" The relevance score for the instance, a value between 0 and 100, which specifies the importance of an entity occurrence in a document. The relevance field is available only for instances of type "EntityOccurrence".
"document_category" The highest scoring topic for this document
"document.id" The identity number of the document
"document.title"
The title of the document
"document.url" The URL of the document
"document.analyzed" The point in time when the document was analyzed
"document.published" The point in time when the document was published by the source
"document.downloaded" The point in time when the document was downloaded
"document.coentities" The list of entities found in the document
"source.id"
The identity number of the source
"source.name" The name of the source
"source.description The description of the source
"source.media_type" The media type of the source
"source.topic" The source topic
"source.country" The originating country of the source
"count" For aggregate queries: The hit count Entity Details The "entity_details" section is a dictionary keyed by entity type name, and the values are lists of the attribute names that should be included in the output. The type, name and momentum are given for all entities. Some attributes are entity attributes, and they may be followed recursively to a certain maximum depth. The default depth is 2, which returns entity information for entities listed as attributes of instances that meet the initial query criteria. You can change the default by setting the depth parameter in the output section. If set to 0, no entity details are given, and if set to −1, there is no depth limit.

Response specification

Responses are returned as a structured JSON string. A response has the following structure:

```
{
"status": <"SUCCESS" or "FAILURE">
"error": <describes the problem in case of FAILURE>
``` entity is specified to be of type company, then you can specify "key": "tickers" in the aggregate query. If no key value is specified, the default value is "id".

The available output fields are source, count, momentum, and sentiment. See the Output fields table for more information. If "source" is set in the "output" fields, the query returns multiple records per day. If the query does not include "source", it returns one record per day.

You can specify an optional output format that specifies the format of the returned "key" aggregates. Note that this field affects only the "key" aggregates; the response document itself is always in JSON format.

"format": "csv" The value of the "key" aggregates is a CSV file encoded as a string with embedded newlines.

"format": "json" (default) The value of the "key" aggregates is a list of JSON dictionaries.

The response is grouped by the specified key and day, where day is in the range specified by "document: "published".

```
{
   "aggregate": {
       "entity": {"type": "Company", "attributes": {"name": "tickers", "string": "AAPL"}},
       "document": {"published": {"min": "2010-02-01", "max": "2010-02-05"}},
       "key": "tickers"
   },
   "output": {
       "fields": ["count", "momentum", "positive", "negative"],
       "format": "csv"
   },
   "token": TOKEN,
}
```

The output with the aggregates formatted as CSV is

```
{
   "status": "SUCCESS",
   "aggregates": "tickers,Day,Count,Momentum,Positive,Negative\r\nAAPL,2010-02-01,130,0.0970647896404,0.04719179308,0.05534764\r\nAAPL,2010-02-02,126,0.131935758091,0.03681524524,0.01985223413\r\nAAPL,2010-02-03,100,0.0712206521117,0.097500107,0.0405818l7\r\nAAPL,2010-02-04,90,0.0507399318718,0.05230126222,0.00760450556\r\n",
   "errors": [ ]
}
```

-continued

```
"instances": <list of matching events instances, in decreasing
    momentum order>
"entities": <a dictionary with details for entities involved in the events>
}
```

If count is specified, not instance or entity details will be returned. The entities section will only be returned if the attributes field is set in the output fields.

Aggregate Queries

Aggregate queries return daily average sentiment, momentum, and total count for entities you specify. Aggregate query format is similar to the format of queries that return records for specific entity and event and instances:

entity is required. See Quick start: creating requests for more information.

document is required and must include the "published" parameter. All other "document" and "source" parameters are optional. See Matching on document and source aspects for more information.

key causes the results to be grouped based on a specified entity aspect, such as id or name or a textual attributes on the entity type specified in the entity section. For example, if the The output with the aggregates formatted as JSON is:

```
{
   "status": "SUCCESS",
   "aggregates": [
       {
           "count": 130, "positive": 0.047191793080000002, "negative": 0.055347639999999997,
           "tickers": "AAPL", "day": "2010-02-01", "momentum": 0.097064789640384896
       },
       {
           "count": 126, "positive": 0.036815245240000002, "negative": 0.01985223413,
           "tickers": "AAPL", "day": "2010-02-02", "momentum": 0.131935758090586
       },
       {
           "count": 100, "positive": 0.097500107000000003, "negative": 0.040581816999999999,
           "tickers": "AAPL", "day": "2010-02-03", "momentum": 0.071220652111714494
       },
       {
           "count": 90, "positive": 0.0523012622199999999, "negative": 0.0076045055599999996,
           "tickers": "AAPL", "day": "2010-02-04", "momentum": 0.050739931871842503
       }
```

You can also create an aggregate query with a more general entity filter, such as this one, which returns all entities in a certain industry sector:

```
"entity": {"type": "Company", "attributes": {"name": "gics",
    "string": "Financials"}}
```

Keep in mind that a less-restricted query like this may take some time, as there are a lot of instances to aggregate.

An aggregate_raw query is a faster but more constrained version of the aggregate query. An aggregate_raw query does not return entity IDs. You must run an entity query to retrieve IDs, then use those IDs in the aggregate_raw query's entity specification.

aggregate_raw queries use this structure:

```
{
  "aggregate_raw": {
    "entity": {"id": [id1, id2, ..., idn]},
    "document": {
      "published": {
        "min": "YYYY-MM-DD",
        "max": " YYYY-MM-DD "
      }
    },
    "output": {
      "fields": ["momentum", "count", "positive", "negative"]
    },
    "token": TOKEN
  }
}
```

This query will summarize momentum, count and sentiment for each id for each day in the published time range. Another option exists to also separate the data by source as well as day and is accessed by adding "source" to the list of output fields

EXAMPLES

Query Examples

This section contains several sample queries.

Example

Mergers

```
{
"comment": "Mergers involving Apple or Google, published last year",
"instance": {
  "type": "Merger",
  "attributes": [
    {"type": "Company",
      "entity": {
        "attributes": {"name": "cusip", "string": ["037833100",
          "38259P508"]}
      }
    }
  ],
  "document": {
    "published": {"min": "2009-01-01", "max": "2009-12-31"}
```

```
  },
  "limit": 2
},
"token": "ABCDEF"
}
```

Example

Quotations

```
{
  "comment": "Barack Obama quotations involving companies in
the financial industry",
  "instance": {
    "type": "Quotation",
    "attributes": [
      {"name": "person", "entity": {"name": "Barack Obama"}},
      {"type": "Company", "entity": {"attributes": {"name": "gics",
"string": "Financials"}}}
    ],
    "limit": 3
  },
  "token": "ABCDEF"
}
```

Example

Mergers or Acquisitions, by Industry Sector

```
{
  "comment": "Mergers or acquisitions involving companies in two
industry sectors",
  "instance": {
    "type": ["Merger", "Acquisition"],
    "attributes": [
      {"type": "Company", "entity": {"attributes": {"name": "gics",
"string": "Information Technology"}}},
      {"type": "Company", "entity": {"attributes": {"name": "gics",
"string": "Telecommunications Services"}}}
    ],
    "limit": 2
  },
  "token": "TOKEN"
}
```

Example

Mergers or Acquisitions, by Company Name

```
{
  "comment": "Mergers or acquisitions involving Apple or
Google",
  "instance": {
    "type": ["Merger", "Acquisition"],
    "attributes": [
      {"type": "Company", "entity": {"attributes": {"name":
"tickers", "string": ["AAPL", "GOOG"]}}}
    ],
    "limit": 2
  },
  "token": "TOKEN"
}
```

Example

Relevance Score

```
{
  "instance": {
    "type": "EntityOccurrence",
    "id": [8821184]
  },
  "output": {
    "fields": ["document.title","relevance", "type", "time",
      "document_category"]
  },
  "token": "TOKEN"
}
```

Example

Search for Entity Instances

```
{
  "instance": {
    "type": "EntityOccurrence",
    "attributes": [{"name": "entity",
        "entity": {"type": "Company",
              "attributes": {"name": "gics",
                  "string": "Financials"}}}],
    "document": {
      "published": {"min": "2010-01-01", "max": "2010-02-01"}
    },
    "limit": 5
  },
  "output": {
    "fields": ["type", "time", "fragment", "sentiment", "momentum",
        "attributes", "document.title", "document.published",
        "source.description"],
    "entity_details":{"Company": ["gics", "cusip", "sedol", "tickers",
      "industries"]}
  },
  "token": "TOKEN"
}
```

Example

Search for Calendar Events

```
{
  "instance": {
    "type": ["EconomicEvent"],
    "attributes": [{"name": "country",
        "entity": {"attributes": [{"name": "name",
                "string": "United States"}]}}],
    "start_time": "2008-09-01",
    "stop_time": "2008-10-01",
    "limit": 10
  },
  "output": {
    "fields": ["type", "time", "attributes", "fragment",
        "document.title", "source.description"]
  },
  "token": "TOKEN"
}
```

Example

Search for Entity Instances

```
{
  "instance": {
    "type": "EntityOccurrence",
    "attributes": [{"name": "entity",
        "entity": {"type": "Company",
              "attributes": {"name": "gics",
                  "string": "Financials"}}}],
    "document": {
      "published": {"min": "2010-01-01", "max": "2010-02-01"}
    },
    "limit": 5
  },
  "output": {
    "fields": ["type", "time", "fragment", "sentiment", "momentum",
        "attributes", "document.title", "document.published",
        "source.description"],
    "entity_details":{"Company": ["gics", "cusip", "sedol", "tickers",
      "industries"]}
  },
  "token": TOKEN
}
```

Response Example

The following sample is the complete response to the query in the Quick Start section earlier in this document:

```
{
  "status": "SUCCESS",
  "instances": [
    {
```

"fragment": "Symantec Corp. (Nasdaq: SYMC) today announced Symantec Data Insight, a new technology that enables organisations to improve data governance through insights into the ownership and usage of unstructured data, including files such as documents, spreadsheets . . . .",

```
"stop": "2010-03-03T23:59:59.000Z",
"start": "2010-03-03T00:00:00.000Z",
"attributes": {
  "status": "announced",
  "product": 117180333,
  "product_type": "Other",
  "company": 33312357,
  "date": "2010-03-03",
  "date_string": "today"
},
  "document": {
    "url": "http://www.scoop.co.nz/stories/BU1003/S00094.htm",
    "source": {
      "description": "Scoop NZ - Business"
    },
    "published": "2010-03-03T00:52:00.000Z",
    "title": "Symantec Answers \u0093Whose Data Is It Anyway?\u0094"
  },
  "type": "ProductRelease",
  "momentum": 0.0
},
],
"errors": [ ],
"entities"
  "33312357": {
    "type": "Company",
    "name": "Symantec",
    "momentum": 0.015923216777303299
```

-continued

```
},
"117180333": {
  "type": "Product",
  "name": "Symantec Data Insight",
  "momentum": 8.3941912196759793e−06
    }
  }
}
```

Working with the API in the Recorded Future UI

You can use the Recorded Future UI to:

automatically generate JSON requests and results for a query you enter in the UI.

generate results for a JSON request you paste into the UI

If you are a registered user with an assigned API token, you'll see the API call link at the top right of the screen when you log into Recorded Future.

Automatically Generating Requests and Results

To automatically generate a request and result, enter a query in the What, Who/Where, and When boxes or, if you have saved Futures, click one to create the query. Click the API call link. Recorded Future displays the structured JSON string for that query. You can copy the string and paste it into your development environment.

To generate the structured JSON string for the result, click the Call API link that appears below the API request. The result appears in a second box, below the request.

Generating Results for a Specified JSON Request

You can paste a JSON request into the API Call box and have Recorded Future automatically generate the appropriate JSON result. This is a useful way to test your code. Click the Call API link or, if the API request box is already displayed, click the Clear link to remove the last request. Paste your request in the box and click Call API to generate the result.

Using the Recorded Future API with R

R is a language and environment for statistical computing and graphics. You can use commonly-available R packages to assist with forming and executing queries, and obtaining and parsing the results.

The RJSONIO Package contains functions that facilitate reading and writing JSON data:

The fromJSON function converts a JSON string into R list objects.

The toJSON function converts R list objects into a JSON string.

The following sample shows a Recorded Future query as a standard R list object with two top level elements: instance and output.

```
>print(Rquery)
$instance
$instance$type
[1] "ProductRelease"
$instance$attributes
$instance$attributes[[1]]
$instance$attributes[[1]]$type
[1] "Company"
$instance$attributes[[1]]$entity
$instance$attributes[[1]]$entity$attributes
$instance$attributes[[1]]$entity$attributes[[1]]
$instance$attributes[[1]]$entity$attributes[[1]]$name
[1] "gics"
$instance$attributes[[1]]$entity$attributes[[1]]$string
[1] "Information Technology"
$instance$document
$instance$document$published
$instance$document$published$min
[1] "2010-01-01"
$instance$document$published$max
[1] "2010-03-12"
$instance$limit
[1] 1
$output
$output$fields
[1]"type" "time" "fragment" "momentum" "attributes"
"document.title" "document.url" "document.published"
"source.description"
```

To create a JSON string, apply the toJSON function to this R list object:

```
> json.Query<-toJSON(Rquery)
> cat(json.Query)
The following sample shows the resulting JSON string:
{
  "instance": {
    "type": ["ProductRelease"],
    "attributes": [{"type": "Company",
        "entity": {"attributes": [{"name": "gics",
            "string": "Information Technology"}]}}],
    "document": {
      "published": {"min": "2010-01-01", "max": "2010-03-12"}
    },
    "limit": 1
  },
  "output": {
    "fields": ["type", "time", "fragment", "momentum", "attributes",
"document.title", "document.url", "document.published",
"source.description"]
  }
}
```

The RCURL Package is an R-interface to the libcurl library. This package assists with creating and submitting URLs that contain the JSON formatted query and with retrieving the results from the response.

The following sample uses RCURL routines to form a URL and retrieve data and then uses the fromJSON function from the RJSONIO package to create the resulting R list objects.

```
> opts = curlOptions(header = FALSE
> url<-paste("http://api.recordedfuture.com/ws/rfq/instances?q=",
RCurl::curlEscape(jsonQuery),"&compress=1",sep="")
> zippedJsonResult<-getBinaryURL(url, .opts = opts)
> jsonResult<rawToChar(memDecompress(zippedJsonResult,type="gzip")
> RqueryResult<-fromJSON(jsonResult)
```

Using the Recorded Future API with Python

A number of Python libraries are available to facilitate reading and writing JSON data, including the popular simplejson and json-py.

The following sample Python code executes two queries and prints some of the results. If you test this sample by incorporating it into your code, remember to replace the value TOKEN with a valid Recorded Future API token.

Sample Python query:

```
#--------------------------------------------
qsource2="""{
    "comment": "Barack Obama quotations involving companies in
the financial industry",
    "instance": {
        "type": ["Quotation"],
        "attributes": [{"name": "person", "entity": {"name":
"Barack Obama"}},
```

```
            {"type": "Company", "entity": {"attributes": [{"name":
"gics", "string": "Financials"}]}}],
        "limit": 1,
        "document": {
            "published": {"min": "2010-01-01", "max": "2010-02-01"},
            "source": {
                "topic": "Business"
            }
        }
    },
    "output": {
        "fields": ["id", "type", "time", "time_fragment", "fragment",
"momentum", "sentiment", "attributes", "canonical.id", "document.id",
"document.title", "document.url", "document.analyzed",
"document.published", "document.downloaded", "source.id",
"source.name", "source.description", "source.media_type",
"source.topic", "source.country"],
        "entities": {
        }
    },
    "token": "API_token"
}"""
qsource="""{
"comment": "Q1 earnings calls",
"instance": {
    "type": ["ConferenceCall"],
```

```
            "attributes": [ {"name": "year", "string": "2009"},
                    {"type": "Company", "entity": {"attributes": [{"name":
"tickers", "string": "C"}]}}]],
        "limit": 50,
        "document": {
            "source": {
                "topic": "Business"
            }
        }
    },
    "output": {
        "fields": ["id", "type", "time", "time_fragment", "fragment",
"momentum", "sentiment", "attributes", "canonical.id", "document.id",
"document.title", "document.url", "document.analyzed",
"document.published", "document.downloaded", "source.id",
"source.name", "source.description", "source.media_type",
"source.topic", "source.country"],
        "entities": {
        }
    },
    "token": "TOKEN"
}"""
```

The following Python sample makes use of the Recorded Future event instances web service.

```
#--------------------------------------------------------
#Python example that takes query and executes
#--------------------------------------------------------
import sys, urllib, json
# Simple program showing how to use the event instances web-service from Python
# Web service URL
url = 'http://api.recordedfuture.com/ws/rfq/instances?%s'
# Wraps the web-service into a python function
# Input: q: a JSON-formatted string specifying the query
# Out: Dict corresponding to the JSON object returned by the web service
def query(q):
    try:
        data = urllib.urlopen(url % urllib.urlencode({"q":q}))
        if type(data) != str:
            data = data.read( )
        #print data
        return json.loads(data)
    except Exception, e:
        return {'status': 'FAILURE', 'errors': str(e)}
# Main program code:
# Open a specified query file (JSON-formatted), and run that query
# The result is a list of event instances matching the query, ordered by momentum
# and a dictionary with detailed information about the involved entities
# Read the query
#qsource = open(sys.argv[1], "r").read( )
# Run the query
res = query(q=qsource)
print(str(res))
# Check if the query succeeded
if res['status'] == 'FAILURE':
    print("Error: " + str(res['errors']))
    sys.exit(1)
# Get the returned structures
entities = res["entities"]
evis = res["instances"]
# Utility function to pretty print an entity overview (name and type)
def eninfo(en):
    return "%s[%s]" % (en["name"], en["type"])
def utf8(s):
    return s.encode('utf-8') if type(s) in [unicode, str] else s
# Iterate of the event instances
for evi in evis:
    # Print basic event instance info (type and time)
    print (evi["type"], evi["start"], "-", evi["stop"])
    # Print the event roles and their values
    for k, v in evi["attributes"].items( ):
        # No metadata available here, so use a simple method to check if
        # the value is an entity reference: try to look it up in the
        # entity dictionary
```

```
        if type(v) in [long, int]:
            en = entities.get(str(v))
            if en:
                v = eninfo(en)
        print ("  %s=%s" % (k, v))
    # Print anonymous entity references (not tied to a role) in the event instance
    v = evi.get("mentions")
    if v:
        v = v if type(v) == list else [v]
        print ("  mentions=%s" % ", ".join([eninfo(entities[str(enid)]) for enid in v]))
    # Print document information
    doc = evi["document"]
    print ("  document:")
    for key in ["title", "source", "url"]:
        print ("    %s=%s" % (key, utf8(doc[key])))
    print ("\nDetails about involved entities:\n")
    for id, en in entities.items( ):
        print (eninfo(en), "(id=" + str(id) + ")")
        for k, v in en.items( ):
            if k in ["name", "type"]:
                continue
            print ("  %s=%s" % (k, v))
```

Entity and Event Types

The following event and entity types are currently available in the system.

Entity Types
Anniversary
City
Company
Continent
Country
Currency
EmailAddress
EntertainmentAwardEvent
Facility
FaxNumber
Holiday
Industry
IndustryTerm
MarketIndex
MedicalCondition
MedicalTreatment
Movie
MusicAlbum
MusicGroup
NaturalFeature
OperatingSystem
Organization
Person
PhoneNumber
Position
Product
ProgrammingLanguage
ProvinceOrState
PublishedMedium
RadioProgram
RadioStation
Region
ReportingEntity
SportsEvent
SportsGame
SportsLeague
Technology
TVShow
TVStation
URL
Event Types Acquisition
Alliance
AnalystEarningsEstimate
AnalystRecommendation
ArmedAssault
Arrest
Arson
Bankruptcy
BiologicalTerrorism
Bombing
BonusSharesIssuance
BusinessRelation
Buybacks
Ceasefire
ChemicalTerrorism
CivilCourtProceeding
CompanyAccountingChange
CompanyAffiliates
CompanyCompetitor
CompanyCustomer
CompanyEarningsAnnouncement
CompanyEarningsGuidance
CompanyEmployeesNumber
CompanyExpansion
CompanyForceMajeure
CompanyFounded
CompanyInvestment
CompanyLaborIssues
CompanyLayoffs
CompanyLegalIssues
CompanyListingChange
CompanyLocation
CompanyMeeting
CompanyNameChange
CompanyProduct
CompanyReorganization
CompanyRestatement
CompanyTechnology
CompanyTicker
CompanyUsingProduct
ConferenceCall
Conviction
CreditRating
CriminalCourtProceeding
Cyberterrorism DebtFinancing
DelayedFiling
DiplomaticRelations
Dividend
EconomicEvent
EmploymentChange
EmploymentRelation
EnvironmentalIssue
Extinction
FamilyRelation
FDAPhase
Hijacking
HostageRelease
HostageTakingKidnapping
Indictment
InsiderTransaction
IPO
JointVenture
ManMadeDisaster
Merger
MilitaryOperation
MiscTerrorism
MovieRelease
MusicAlbumRelease
NaturalDisaster
NuclearTerrorism
PatentFiling
PatentIssuance
PersonAttributes
PersonCareer
PersonCommunication
PersonEducation
PersonEmailAddress
PersonRelation
PersonTravel
PoliceOperation
PoliticalEndorsement
PoliticalEvent
PoliticalRelationship
PollResult
ProductIssues
ProductRecall
ProductRelease
Quotation
Robbery
SecondaryIssuance
StockSplit
TerrorCommunication
TerrorFinancing
Trafficking
Trial
Vandalism
VotingResult The system described above has been implemented in connection with special-purpose software programs running on general-purpose computer platforms, but it could also be implemented in whole or in part using special-purpose hardware. And while the system can be broken into the series of modules and steps shown for illustration purposes, one of ordinary skill in the art would recognize that it is also possible to combine them and/or split them differently to achieve a different breakdown, and that the functions of such modules and steps can be arbitrarily distributed and intermingled within different entities, such as routines, files, and/or machines. Moreover, different providers can develop and operate different parts of the system.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A computer-based search engine method for a processor and a storage device including instructions configured to run on the processor to electronically extract predicted machine-readable search engine query information items from a collection of stored, machine-readable electronic documents along with timing for the machine-readable query information items, comprising:
   electronically accessing linguistic content of at least a subset of the stored electronic documents using an electronically accessed interface, wherein each particular electronic document in the subset has a publication time and includes different machine-readable predictive information about one or more future facts occurring after the publication time,
   electronically extracting the predictive information including a predicted time of occurrence for one or more of the future facts from linguistic analysis of the linguistic content of the accessed documents, and
   electronically deriving one or more predicted machine-readable search engine query information items formatted in such a way as to electronically search stored, machine-readable electronic documents using a search engine and timing for the predicted machine-readable search engine query information items based on the predictive information extracted electronically in the step of extracting.

2. The method of claim 1 wherein the step of deriving predicted query information derives search engine queries.

3. The method of claim 1 further including the step of deriving advertising selections based on the step of deriving predicted query information.

4. The method of claim 1 wherein the step of deriving predicted query information derives result pages for the queries.

5. The method of claim 4 further including the step of deriving advertising selections for the result pages based on the step of deriving predicted query information.

6. The method of claim 1 wherein the step of deriving predicted query information derives keywords for queries.

7. The method of claim 1 wherein the step of deriving one or more predicted query information items derives results for queries.

8. The method of claim 1 wherein the step of extracting information includes extracting a predicted likelihood of occurrence for one or more of the facts.

9. The method of claim 1 wherein the step of accessing content includes at least:
   accessing a first document that includes predictive information about a first fact, and
   accessing a second document that includes predictive information about the first fact, and
   wherein the step of extracting includes at least:
   extracting predictive information about the first fact from the first document, and
   extracting predictive information about the first fact from the second document, and wherein the step of deriving predicted query information items derives the predicted query information items and timing based on the timing of the predictive information extracted in the step of extracting for the first fact from the first and second documents.

10. The method of claim 1, wherein the step of electronically accessing linguistic content of at least a subset of the stored electronic documents includes applying an event-based query to at least the subset of the stored electronic documents, and wherein the step of electronically extracting extracts the predictive information including the predicted time of occurrence based on the event-based query.

11. The method of claim 1 wherein the step of electronically accessing linguistic content of at least a subset of stored electronic documents includes accessing documents that are received from the Internet and wherein queries derived in the step of electronically deriving are used to search the Internet.

12. The method of claim 1 wherein the step of electronically accessing linguistic content of at least a subset of stored electronic documents includes accessing documents that are received incrementally in real time.

13. An apparatus including a processor and a storage device including instructions configured to run on the processor for electronically extracting predicted machine-readable search engine query information items from a collection of stored, machine-readable electronic documents along with timing for the machine-readable query information items, comprising:
    an electronic interface operative to electronically access linguistic content of at least a subset of the stored electronic documents, wherein each particular document in the subset has a publication time and includes different machine-readable predictive information about one or more future facts occurring after the publication time,
    a predictive information extraction subsystem operative to electronically extract the predictive information including a predicted time of occurrence for the one or of the more future facts from linguistic analysis of the linguistic content of accessed documents, and
    a predictive query information derivation subsystem operative to electronically derive one or more predicted machine-readable search engine query information items formatted in such a way as to electronically search stored, machine-readable electronic documents using a search engine based on the predictive information extracted electronically by the predictive information extraction subsystem.

14. The apparatus of claim 13 wherein the predictive query information derivation subsystem is operative to derive search engine queries.

15. The apparatus of claim 13 further including an advertising selection derivation subsystem responsive to the predictive query information derivation subsystem.

16. The apparatus of claim 13 wherein the predictive query information derivation subsystem is operative to derive result pages for the queries.

17. The apparatus of claim 16 further including an advertising selection derivation subsystem for the result pages responsive to the predictive query information derivation subsystem.

18. The apparatus of claim 13 wherein the predictive query information derivation subsystem is operative to derive keywords for queries.

19. The apparatus of claim 13 wherein the predictive query information derivation subsystem is operative to derive results for queries.

20. The apparatus of claim 13 wherein the information extraction subsystem is operative to extract a predicted time of occurrence for one or more of the facts.

21. The apparatus of claim 13 wherein the information extraction subsystem is operative to extract a predicted likelihood of occurrence for one or more of the facts.

22. The apparatus of claim 13 wherein the electronic interface includes an application programming interface that is operative to receive and apply an event-based query to at least the subset of the stored electronic documents, and wherein the a predictive information extraction subsystem operative to electronically extract the predictive information including the predicted time of occurrence based on the event-based query.

23. The apparatus of claim 13 wherein the stored electronic documents include documents that are received incrementally in real time.

24. An apparatus including a processor and a storage device including instructions configured to run on the processor for electronically extracting predicted machine-readable search engine query information items from a collection of stored, machine-readable electronic documents along with timing for the machine-readable query information items, comprising:
    electronically accessed means for electronically accessing linguistic content of at least a subset of the stored electronic documents, wherein each particular document in the subset has a publication time and includes different machine-readable predictive information about one or more future facts occurring after the publication time,
    means for electronically extracting the predictive information including a predicted time of occurrence for the one or more of the future facts from linguistic analysis of the linguistic content of the accessed documents, and
    means for electronically deriving one or more predicted machine-readable search query information items formatted in such a way as to electronically search stored, machine-readable electronic documents using a search engine based on the predictive information extracted electronically by the means for extracting.

* * * * *